(12) United States Patent
Shinozaki

(10) Patent No.: US 6,570,285 B2
(45) Date of Patent: May 27, 2003

(54) MAGNETIC BEARING APPARATUS HAVING A PROTECTIVE NON-MAGNETIC CAN

(75) Inventor: Hiroyuki Shinozaki, Kanagawa-ken (JP)

(73) Assignee: Ebara Corporation, Tokyo (JP)

(*) Notice: Subject to any disclaimer, the term of this patent is extended or adjusted under 35 U.S.C. 154(b) by 0 days.

(21) Appl. No.: 09/746,335

(22) Filed: Dec. 26, 2000

(65) Prior Publication Data

US 2002/0047399 A1 Apr. 25, 2002

(30) Foreign Application Priority Data

Dec. 27, 1999 (JP) .......................................... 11-369557

(51) Int. Cl.⁷ ................................................ H02K 7/09
(52) U.S. Cl. ..................................................... 310/90.5
(58) Field of Search ........................................ 310/90.5

(56) References Cited

U.S. PATENT DOCUMENTS

| | | | |
|---|---|---|---|
| 4,072,370 A | * 2/1978 | Wasson | 308/10 |
| 4,500,142 A | 2/1985 | Brunet | 308/10 |
| 4,948,348 A | 8/1990 | Doll et al. | 417/365 |
| 4,988,906 A | * 1/1991 | Littlefield | 310/90.5 |
| 5,036,236 A | * 7/1991 | Wilson | 310/90.5 |
| 5,111,102 A | * 5/1992 | Meeks | 310/90.5 |
| 5,130,588 A | * 7/1992 | Armstrong et al. | 310/90.5 |
| 5,159,219 A | * 10/1992 | Chu et al. | 310/90.5 |
| 5,196,748 A | * 3/1993 | Rigney | 310/90.5 |
| 5,204,568 A | * 4/1993 | Kleinberg et al. | 310/90.5 |
| 5,216,308 A | * 6/1993 | Meeks | 310/90.5 |
| 5,220,232 A | * 6/1993 | Rigney, II et al. | 310/90.5 |
| 5,302,874 A | * 4/1994 | Pinkerton | 310/90.5 |
| 5,315,197 A | * 5/1994 | Meeks et al. | 310/90.5 |
| 5,469,007 A | * 11/1995 | Toyama | 310/90.5 |
| 5,514,924 A | * 5/1996 | McMullen et al. | 310/90.5 |
| 5,641,054 A | * 6/1997 | Mori et al. | 198/619 |
| 5,720,160 A | * 2/1998 | Traxler et al. | 57/76 |
| 5,726,512 A | * 3/1998 | Chu et al. | 301/90.5 |

(List continued on next page.)

FOREIGN PATENT DOCUMENTS

| | | |
|---|---|---|
| DE | 1 202 392 | 10/1965 |
| EP | 1 041 288 | 10/2000 |
| FR | 1.239.475 | 7/1959 |
| FR | 2.102.520 | 4/1972 |
| JP | 04-179626 | 6/1992 |
| JP | 05196041 A * | 8/1993 |
| JP | 9-9569 | 1/1997 |
| JP | 2001132747 A * | 5/2001 |
| JP | 2001135610 A * | 5/2001 |

OTHER PUBLICATIONS

Copy of European Patent Office Communication including European Search Report for corresponding European Patent Application No. 00128560 dated Oct. 8, 2002.
Copy of European Patent Office Communication including European Search Report for corresponding European Patent Office Application 00128560 dated Apr. 30, 2002.

Primary Examiner—Nestor Ramirez
Assistant Examiner—Pedro J. Cuevas
(74) Attorney, Agent, or Firm—Armstrong, Westerman & Hattori, LLP

(57) ABSTRACT

A magnetic bearing apparatus wherein a can made of a non-magnetic material is disposed between a rotor and a stator, and the rotor is supported in a levitational manner by a magnetic force from an electromagnet provided on a stator-side member. A yoke of the electromagnet is disposed to extend through the can, or a magnetic member is buried in a portion of the can which the yoke of the electromagnet faces, so that the yoke faces a target on the rotor directly or through the magnetic member in a non-contact manner. Accordingly, the magnetic gap between the yoke and the target decreases correspondingly, and hence the magnetic reluctance reduces. Therefore, it becomes possible to reduce the size of the electromagnet.

5 Claims, 8 Drawing Sheets

U.S. PATENT DOCUMENTS

| | | | |
|---|---|---|---|
| 5,729,065 A | * | 3/1998 | Fremery et al. ............ 310/90.5 |
| 5,729,066 A | * | 3/1998 | Soong et al. .............. 310/90.5 |
| 5,847,480 A | * | 12/1998 | Post ......................... 310/90.5 |
| 5,856,719 A | * | 1/1999 | De Armas ................. 310/103 |
| 6,121,704 A | * | 9/2000 | Fukuyama et al. ........ 310/90.5 |
| 6,201,329 B1 | * | 3/2001 | Chen ......................... 310/90.5 |
| 6,262,505 B1 | * | 7/2001 | Hockney et al. ........... 310/90.5 |
| 6,268,673 B1 | * | 7/2001 | Shah et al. ................. 310/90.5 |
| 6,268,674 B1 | * | 7/2001 | Takahashi .................. 310/90.5 |
| 6,373,156 B2 | * | 4/2002 | Suzuki et al. ............. 310/68 B |
| 6,373,159 B1 | * | 4/2002 | Shinozaki .................. 310/90.5 |
| 6,420,810 B1 | * | 7/2002 | Jeong ........................ 310/90.5 |

* cited by examiner (a)

(b)

(c)

(a)

(b)

(a)

(b)

MAGNETIC BEARING APPARATUS HAVING A PROTECTIVE NON-MAGNETIC CAN

BACKGROUND OF THE INVENTION

1. Field of the Invention

The present invention relates to a magnetic bearing apparatus wherein a can made of a non-magnetic material is disposed between a rotor and a stator, and the rotor is supported in a levitational manner by a magnetic force of an electromagnet provided on a stator-side member.

2. Description of the Related Art

In a magnetic bearing apparatus used in a special atmosphere, e.g., a corrosive gas atmosphere, a can made of a non-magnetic material is disposed between a rotor and a stator to protect, from the corrosive gas, an electromagnet of a magnetic bearing, sensors for detecting a displacement and rotation of the rotor and a motor stator for applying a rotational magnetic force to the rotor, which are provided on a stator-side member.

In processing systems which handle various processing gases, the inner surface of the stator is sealed by providing a can between a rotor and a stator as stated above, thereby preventing the processing gas from being contaminated with particles, an organic gas, etc., emitted from the stator side elements.

However, the provision of a non-magnetic can between the rotor and the stator involves some problems. That is, the magnetic gap between the rotor and the stator increases correspondingly. Consequently, the magnetic reluctance increases, and the control magnetic force for levitating the rotor decreases unfavorably. Further, it is necessary in order to obtain a large control magnetic force to increase the ampere-turns of electromagnet coils, i.e., the magnetomotive force of the electromagnet. This causes the electromagnet to increase in size unfavorably.

In a case where an inductance type sensor is used as a displacement sensor or a rotation sensor, the provision of a non-magnetic can between a sensor yoke and a rotor target causes the magnetic gap between the sensor yoke and the rotor target to increase by an amount corresponding to the wall thickness of the can. Consequently, the magnetic reluctance increases, and the sensor sensitivity decreases unfavorably. In order to improve the sensor sensitivity, it is necessary to increase the ampere-turns of the detection coils. This causes the sensor to increase in size undesirably.

Further, the provision of a non-magnetic can between the rotor and the motor stator for applying rotational force to the rotor causes the magnetic gap between the stator and the rotor to increase by an amount corresponding to the wall thickness of the can. Consequently, the magnetic rotational force decreases unfavorably. In order to increase the magnetic rotational force, it is necessary to increase the ampere-turns of the stator coils. This causes the motor to increase in size undesirably. In addition, the efficiency of the motor is decreased.

SUMMARY OF THE INVENTION

In view of the above-described circumstances, an object of the present invention is to provide a magnetic bearing apparatus which is free from a decrease in sensor sensitivity, a decrease in the control magnetic force for levitating or decrease in the magnetic rotational force of the motor stator even when a can made of a non-magnetic material is disposed between the stator and the rotor, and which allows downsizing of a sensor and an electromagnet provided in a magnetic bearing, and a motor.

According to a first aspect thereof, the present invention is applied to a magnetic bearing apparatus wherein a can made of a non-magnetic material is disposed between a rotor and a stator so as to cover the surface of the stator, and the rotor is supported in a levitational manner by a magnetic force generated by an electromagnet provided on a stator-side member. In addition, a yoke of the electromagnet is disposed to extend through the can, or a magnetic member is buried in a portion of the can which the yoke of the electromagnet faces, so that the yoke faces a target for magnetic levitation on the rotor directly or through the magnetic member in a non-contact manner.

In the above arrangement, because the yoke of the electromagnet is disposed to extend through the can or a magnetic member is buried in a portion of the can which the yoke of the electromagnet faces as stated above, the magnetic gap between the yoke and the rotor side target decreases correspondingly, and hence the magnetic reluctance reduces. Therefore, it becomes possible to reduce the size of the electromagnet.

According to a second aspect thereof, the present invention is applied to a magnetic bearing apparatus wherein a can made of a non-magnetic material is disposed between a rotor and a stator so as to cover the surface of the stator, and the rotor is supported in a levitational manner by a magnetic force of an electromagnet provided on a stator-side member, and further a displacement of the rotor is detected with a displacement sensor provided on the stator-side member. In addition, at least a yoke of the displacement sensor is disposed to extend through the can, or a magnetic member is buried in a portion of the can which the yoke of the displacement sensor faces, so that the yoke faces a target for detecting displacement on the rotor directly or through the magnetic member in a non-contact manner.

In the arrangement stated above, because the yoke of the displacement sensor is disposed to extend through the can or a magnetic member is buried in a portion of the can which the yoke of the displacement sensor faces as stated above, the magnetic gap between the yoke and the rotor side target decreases correspondingly, and hence the magnetic reluctance decreases. Therefore, it becomes possible to reduce the size of the displacement sensor. In addition, it becomes possible to improve the detection sensitivity.

According to a third aspect thereof, the present invention is applied to a magnetic bearing apparatus wherein a can made of a non-magnetic material is disposed between a rotor and a stator so as to cover the surface of the stator, and the rotor is supported in a levitational manner by a magnetic force from an electromagnet provided on a stator-side member, and further rotation of the rotor is detected with a rotation sensor provided on the stator-side member. In addition, at least a yoke of the rotation sensor is disposed to extend through the can, or a magnetic member is buried in a portion of the can which the yoke of the rotation sensor faces, so that the yoke faces a target for detecting rotation on the rotor directly or through the magnetic member in a non-contact manner.

In this arrangement, because the yoke of the rotation sensor is disposed to extend through the can or a magnetic member is buried in a portion of the can which the yoke of the rotation sensor faces as stated above, the magnetic gap between the yoke and the rotor side target decreases correspondingly, and hence the magnetic reluctance decreases. Therefore, it becomes possible to reduce the size of the rotation sensor. In addition, it becomes possible to improve the detection sensitivity.

According to a fourth aspect thereof, the present invention is applied to a magnetic bearing apparatus wherein a can made of a non-magnetic material is disposed between a rotor and a stator so as to cover the surface of the stator, and the rotor is supported in a levitational manner by a magnetic force generated by an electromagnet provided on a stator-side member, and further the rotor is rotated by a magnetic force from a motor stator provided on the stator-side member. In addition, at least a yoke of the motor stator is disposed to extend through the can, or a magnetic member is buried in a portion of the can which the yoke of the motor stator faces, so that the yoke faces the motor rotor directly or through the magnetic member in a non-contact manner.

In this arrangement, because the yoke of the motor stator is disposed to extend through the can or a magnetic member is buried in a portion of the can which the yoke of the motor stator faces as stated above, the magnetic gap between the yoke and the motor rotor decreases correspondingly, and hence the magnetic reluctance decreases. Therefore, it becomes possible to reduce the size of the motor. In addition, it becomes possible to improve the efficiency of the motor.

The above and other objects, features and advantages of the present invention will become more apparent from the following description of the preferred embodiments thereof, taken in conjunction with the accompanying drawings.

DESCRIPTION OF THE PREFERRED EMBODIMENTS

Embodiments of the present invention will be described below in detail with reference to the accompanying drawings.

Figure 1:
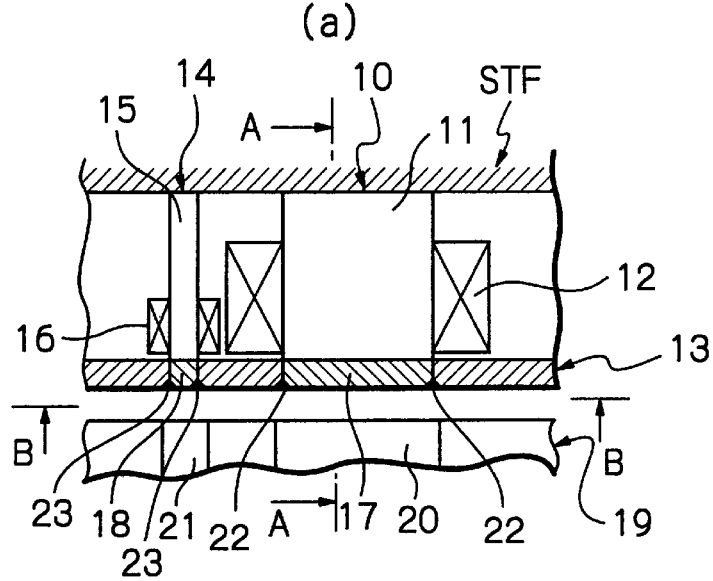
FIG. 1 is a diagram showing the arrangement of a radial magnetic bearing section of the magnetic bearing apparatus according to the present invention, in which: part (a) is a sectional side view; part (b) is a sectional view as seen in the direction of the arrow A–A in part (a); and part (c) is a view as seen in the direction of the arrow B–B in part (a).
Figure 1:
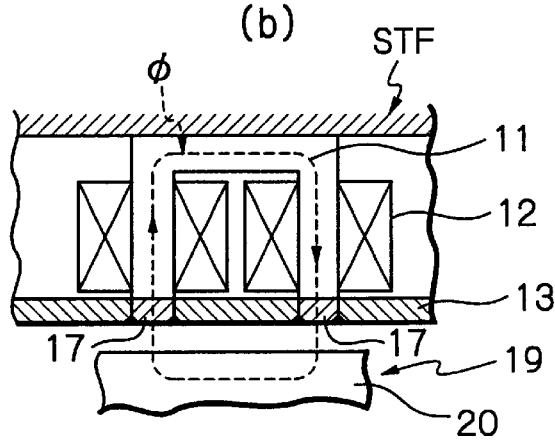
Figure 1:
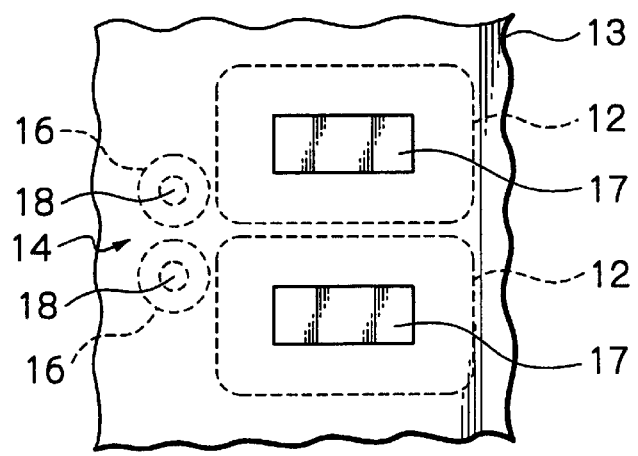

FIG. 1 shows the arrangement of a radial magnetic bearing section of the magnetic bearing apparatus according to the present invention. In FIG. 1: part (a) is a sectional side view; part (b) is a sectional view as seen in the direction of the arrow A–A in part (a); and part (c) is a view as seen in the direction of the arrow B–B in part (a). An electromagnet 10 constituting a magnetic bearing has a U-shaped yoke 11. Coils 12 are wound on the yoke 11. An inductance type radial displacement sensor 14 has a U-shaped yoke 15 and detection coils 16 are wound on the yoke 15.

The electromagnet 10 and the radial displacement sensor 14 are secured to a stator-side member (stator frame STF) to face a rotor 19. A can 13 is disposed between the stator having the electromagnet 10 and the radial displacement sensor 14 and the rotor 19. The can 13 is secured to the stator-side member. The can 13 is made of a non-magnetic material. Magnetic members 17 are buried in portions of the can 13 where the ends of the yoke 11 of the electromagnet 10 are located. The magnetic members 17 are of the same material or quality as that of the yoke 11. Similarly, magnetic members 18 are buried in portions of the can 13 where the ends of the yoke 15 of the radial displacement sensor 14 are located. The magnetic members 18 are of the same material or quality as that of the yoke 15. The portions of the can 13 in which the magnetic members 17 and 18 are buried are provided with joint sealing portions 22 and 23, respectively, formed by welding or the like and subjected to finishing.

An electromagnet target 20 made of a magnetic material is secured to a portion of the rotor 19 which the yoke 11 of the electromagnet 10 faces through the magnetic members 17. Thus, magnetic flux $\Phi$ produced from the electromagnet 10 passes through a magnetic path, as shown in part (b) of FIG. 1, which extends from the yoke 11 through the magnetic member 17, the electromagnet target 20 and the magnetic member 17 to the yoke 11, thereby applying magnetic levitating force to the rotor 19. Thus, because the magnetic members 17 of the same material or quality as that of the yoke 11 of the electromagnet 10 are buried in portions of the can 13 where the ends of the yoke 11 are located, even though the can 13 made of a non-magnetic material is provided between the stator and the rotor, it causes no increase in the magnetic reluctance of the magnetic path and no reduction in the magnetic levitating force of the electromagnet 10. Accordingly, it becomes possible to reduce the size of the electromagnet 10.

A sensor target 21 made of a magnetic material is secured to a portion of the rotor 19 which the yoke 15 of the radial displacement sensor 14 faces through the magnetic members 18. Thus, a magnetic path is formed which extends from the yoke 15 through the magnetic member 18, the sensor target 21 and the magnetic member 18 to the yoke 15. Displacement of the rotor 19 causes a change in the gap between the magnetic members 18 and the sensor target 21. This causes a change in the magnetic reluctance of the magnetic path, and thus the inductance of the detection coils 16 changes.

The radial displacement sensor 14 detects a displacement of the rotor 19 from the change in inductance of the detection coils 16. Thus, because the magnetic members 18 of the same material or quality as that of the yoke 15 of the radial displacement sensor 14 are buried in portions of the can 13 where the ends of the yoke 15 are located, even though the can 13 made of a non-magnetic material is provided between the stator and the rotor, it causes no increase in the magnetic reluctance of the magnetic path and no reduction in the sensitivity of the radial displacement sensor 14. Accordingly, it is unnecessary to increase the size of the detection coils 16 and hence possible to reduce the size of the radial displacement sensor 14.

Although in the foregoing embodiment the magnetic members 17 and 18, which are buried in the can 13, are of the same material or quality as that of the yokes 11 and 15, it is preferable to use a magnetic material that is resistant to such a corrosive environment, if the material of the yokes 11 and 15 is not resistant to a corrosive environment. It should be noted that in part (b) of FIG. 1 the respective cross-sections of the stator frame STF, the can 13, the rotor 19, etc. are shown by straight lines for the sake of drawing. Actually, the cross-sections of them are arcuate.

Figure 2:
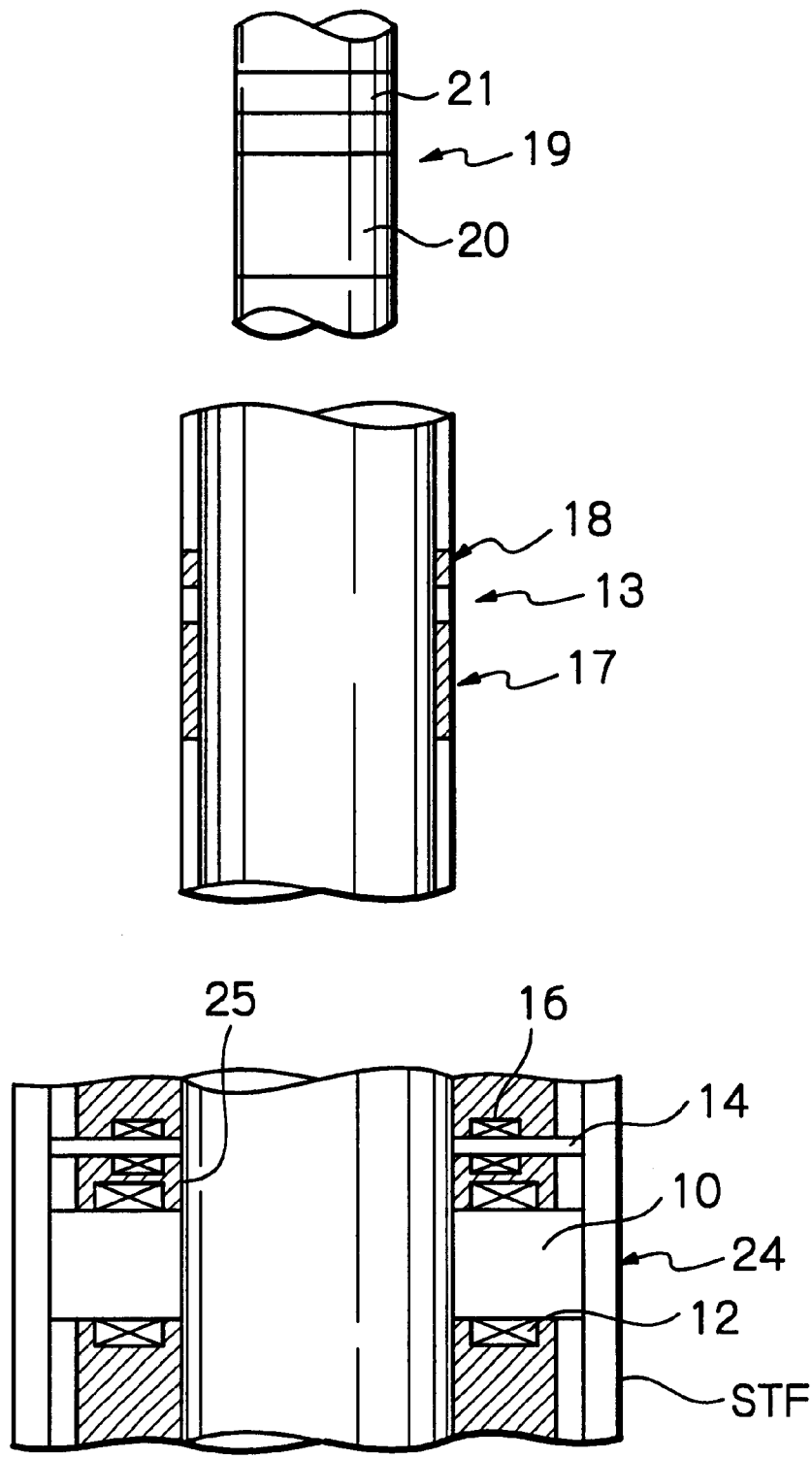
FIG. 2 is a diagram showing the radial magnetic bearing in a disassembled state.

FIG. 2 shows the above-described radial magnetic bearing in a disassembled state. The rotor 19 is in the shape of a column or a circular cylinder. The electromagnet target 20 and the sensor target 21, which are made of a magnetic material, are secured to respective portions of the rotor 19 at which the electromagnet 10 and the radial displacement sensor 14 are located. The can 13, which is made of a non-magnetic material, is in the shape of a circular cylinder. The magnetic members 17 and 18 are buried in respective portions of the can 13 at which the electromagnet 10 and the radial displacement sensor 14 are located. A stator 24 has the electromagnet 10 and the radial displacement sensor 14 fitted to the inner peripheral wall of the cylindrical stator frame STF by filling a resin material or the like. The stator 24 has a through-hole 25 formed in the center thereof to receive the can 13. The outer diameter of the can 13 and the inner diameter of the through-hole 25 are approximately equal to each other. The can 13 in a cooled state is inserted into the through-hole to thereby secure the can 13 in the through-hole.

A magnetic bearing exhibiting high corrosion resistance and superior assembleability can be constructed by adopting a material of high corrosion resistance for each of the can 13, the magnetic members 17 and 18 buried in the can 13, the rotor 19, the electromagnet target 20 and the sensor target 21, which are secured to the rotor 19. In this embodiment, PB, PC, magnetic stainless steel or an Fe-Si material is adopted as a material for the electromagnet target 20 and the sensor target 21. The can 13 is formed from SUS316L or SUS304. A laminate of silicon steel sheets is used for the yoke 11 of the electromagnet 10 and the yoke 15 of the radial displacement sensor 14.

Figure 3:
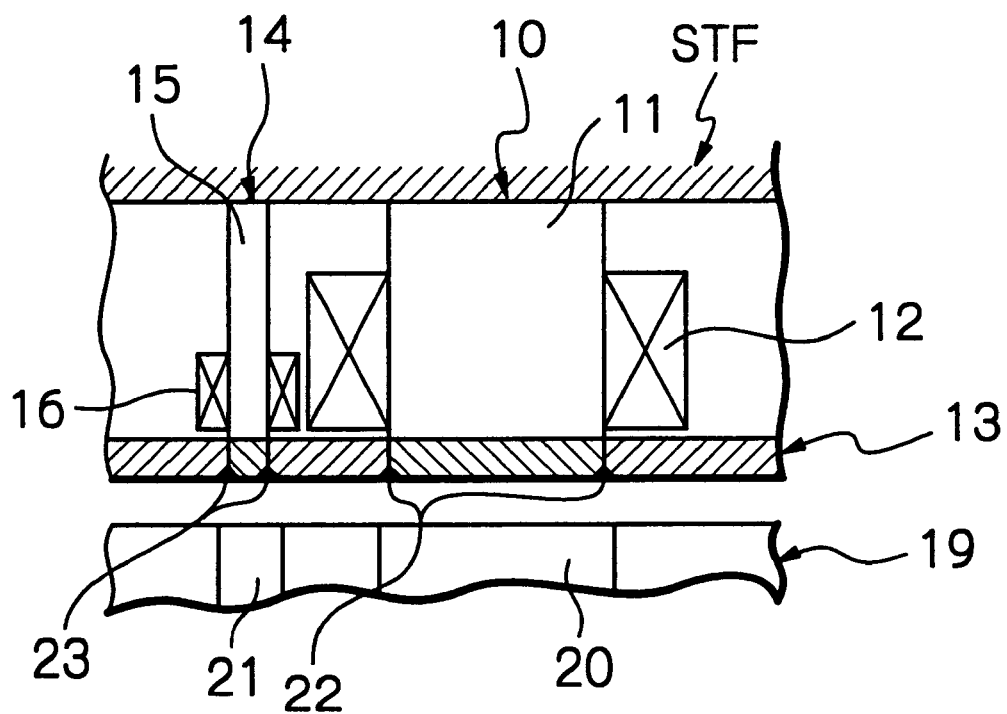
FIG. 3 is a sectional side view showing another example of a radial magnetic bearing section of the magnetic bearing apparatus according to the present invention.

In the above-described embodiment, the magnetic members 17 and 18 are buried in the can 13 so that the yoke 11 of the electromagnet 10 and the yoke 15 of the radial displacement sensor 14 face the electromagnet target 20 and the sensor target 21, respectively, on the rotor 19 through the magnetic members 17 and 18 in a non-contact manner. However, as shown in FIG. 3, the arrangement may be such that the yoke 11 of the electromagnet 10 and the yoke 15 of the radial displacement sensor 14 are disposed to extend through the can 13 so as to face directly the electromagnet target 20 and the sensor target 21, respectively, on the rotor 19 in a non-contact manner. This arrangement provides the same advantages as those described above in terms of magnetic action in the above-described arrangement.

Figure 4:
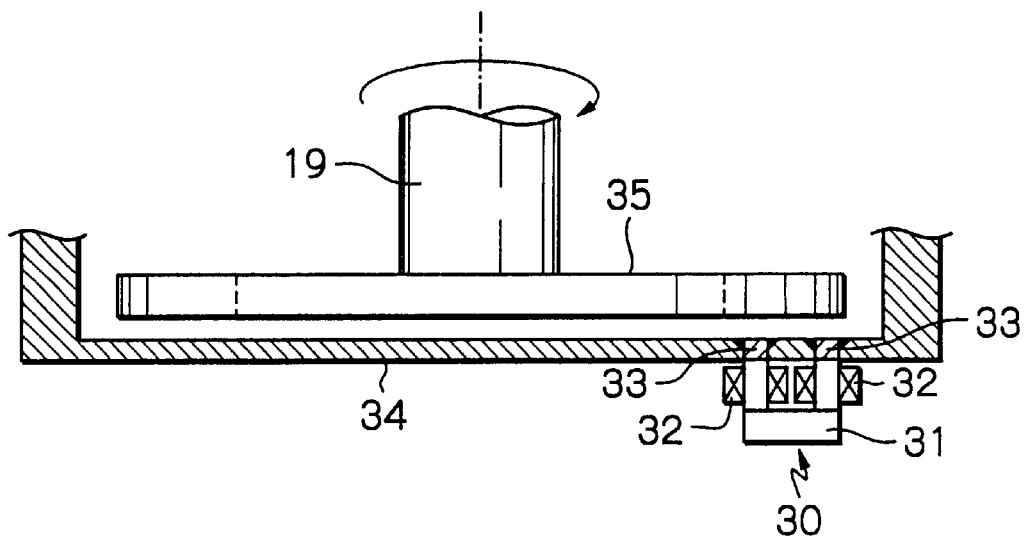
FIG. 4 is a diagram showing the arrangement of a rotation sensor section of the magnetic bearing apparatus according to the present invention, in which: part (a) is a sectional side view; and part (b) is a fragmentary plan view showing a part of a rotation target.
Figure 4:
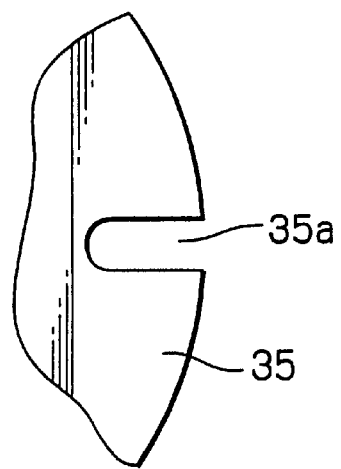

FIG. 4 shows the arrangement of a rotation sensor section of the magnetic bearing apparatus according to the present invention. In FIG. 4, part (a) is a sectional side view of the rotation sensor section, and part (b) is a fragmentary plan view showing a part of a rotation target. A rotation sensor 30 has a U-shaped yoke 31. Detection coils 32 are wound on the yoke 31. A can 34 is made of a non-magnetic material. Magnetic members 33 of the same material or quality as that of the yoke 31 are buried in the can 34 at respective positions which the distal ends of the yoke 31 face. That is, the yoke 31 faces the rotation target 35 through the magnetic members 33. The rotation target 35 is made of a magnetic material with a disk-like shape and secured to the rotor 19. The rotation target 35 has radial slits 35a formed in the outer peripheral portion thereof at predetermined spaces.

In the rotation sensor 30 arranged as stated above, when the yoke 31 faces a portion of the rotation target 35 other than the slits 35a through the magnetic members 33, a magnetic path of small magnetic reluctance is formed which extends from the yoke 31 through the magnetic member 33, the rotation target 35 and the magnetic member 33 to the yoke 31. When the yoke 31 faces a slit 35a through the magnetic members 33, there is a change in the magnetic reluctance of the magnetic path because the magnetic reluctance in the area of the slit 35a is large. Consequently, there is a change in the inductance of the detection coils 32. By detecting the number of slits 35a passing per unit time from the change in the inductance, the rotational speed of the rotor 19 can be detected.

Thus, because the magnetic members 33 of the same material or quality as that of the yoke 31 of the rotation sensor 30 are buried in portions of the can 34 where the ends of the yoke 31 are located, even though the can 34 made of a non-magnetic material is provided between the stator and the rotor, it causes no increase in the magnetic reluctance of the above-described magnetic path. Accordingly, it is possible to reduce the size of the rotation sensor 30. Although in the described embodiment the magnetic members 33 are buried in the can 34 so that the yoke 31 of the rotation sensor 30 faces the rotation target 35 of the rotor 19 through the magnetic members 33 in a non-contact manner, the arrangement may be such that the distal ends of the yoke 31 are disposed to extend through the can 34 so as to face directly the rotation target 35 in a non-contact manner like in the arrangement shown in FIG. 3. This arrangement provides the same advantages as those described above.

Also, although in the foregoing embodiment the magnetic members 33, which are buried in the can 34, are of the same material or quality as that of the yoke 31, it is preferable to use a magnetic material that is resistant to a corrosive environment, if the material of the yoke 31 is not resistant to a corrosive environment.

Figure 5:
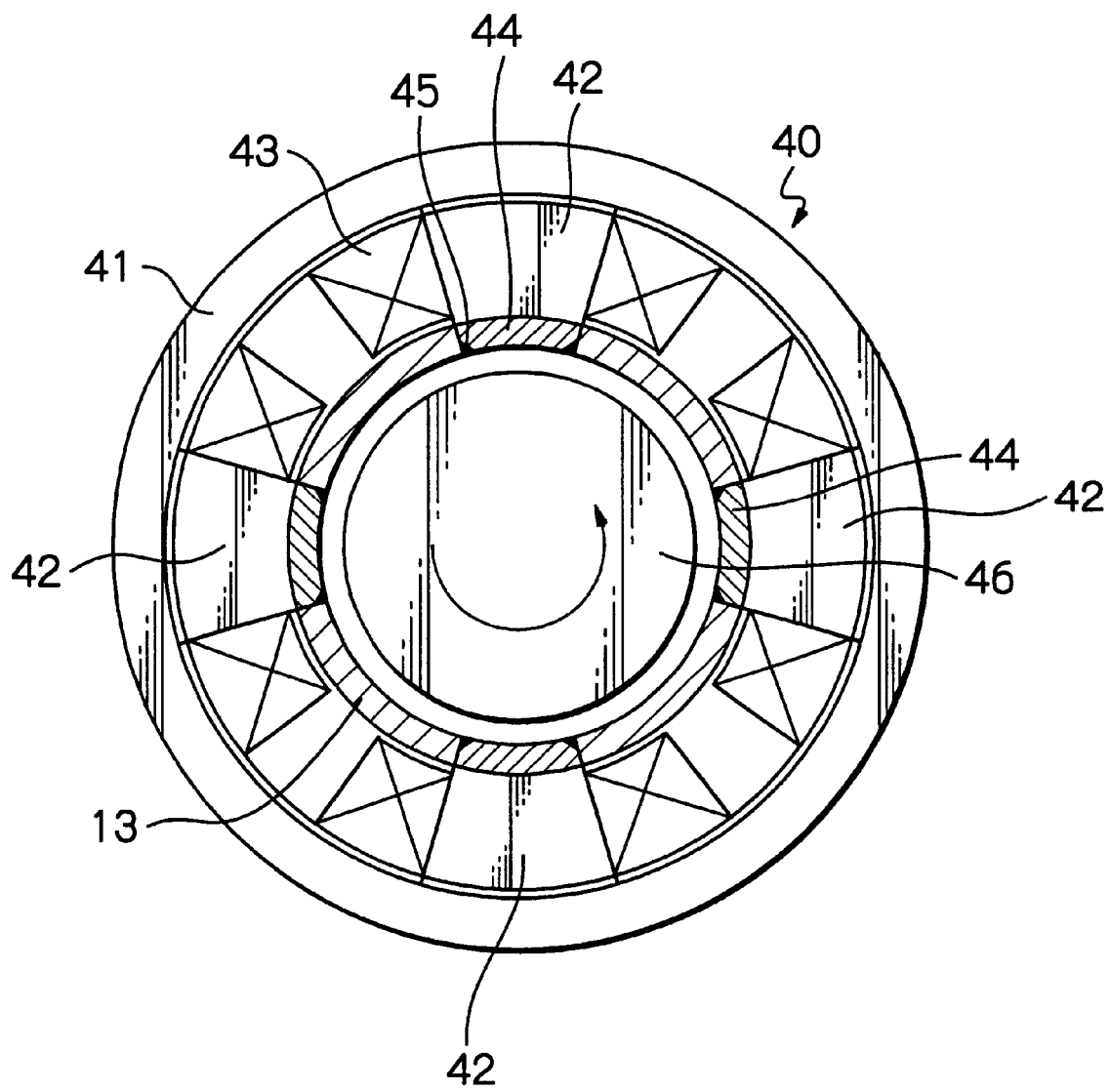
FIG. 5 is a sectional view showing the arrangement of a motor section of the magnetic bearing apparatus according to the present invention.

FIG. 5 is a sectional view showing the arrangement of a motor section of the magnetic bearing apparatus according to the present invention. A motor section 40 includes a stator yoke 41 having four magnetic poles 42 projecting radially inwardly. Stator windings 43 are wound on the magnetic poles 42, respectively. A cylindrical can 13 made of a non-magnetic material is fitted to the inner periphery of the stator yoke 41. Magnetic members 44 of the same material or quality as that of the stator yoke 41 are buried in portions of the can 13 at which the distal ends of the magnetic poles 42 of the stator yoke 41 are located. The portions of the can 13 in which the magnetic members 44 are buried are provided with joint sealing portions 45, respectively, by welding or the like. Reference numeral 46 denotes a motor rotor (motor target) provided on the rotor 19.

In the above arrangement, because the magnetic poles 42 of the stator yoke 41 are disposed to face the motor rotor 46 in a non-contact manner through the magnetic members 44 buried in the can 13 as stated above, even though the can 13 made of a non-magnetic material is provided between the stator and the rotor, it causes no increase in the magnetic gap between the stator yoke 41 and the motor rotor 46 and hence no increase in the magnetic reluctance. Accordingly, there is no reduction in the magnetic rotational force of the motor stator, and it is possible to reduce the size of the motor.

Although in the foregoing embodiment the magnetic members 44 are buried in the can 13 so that the magnetic poles 42 of the stator yoke 41 face the motor rotor 46 through the magnetic members 44 in a non-contact manner, the arrangement may be such that the magnetic poles 42 are disposed to extend through the can 13 so as to face directly the motor rotor 46 in a non-contact manner like in the arrangement shown in FIG. 3. This arrangement provides the same advantages as those described above.

Figure 6:
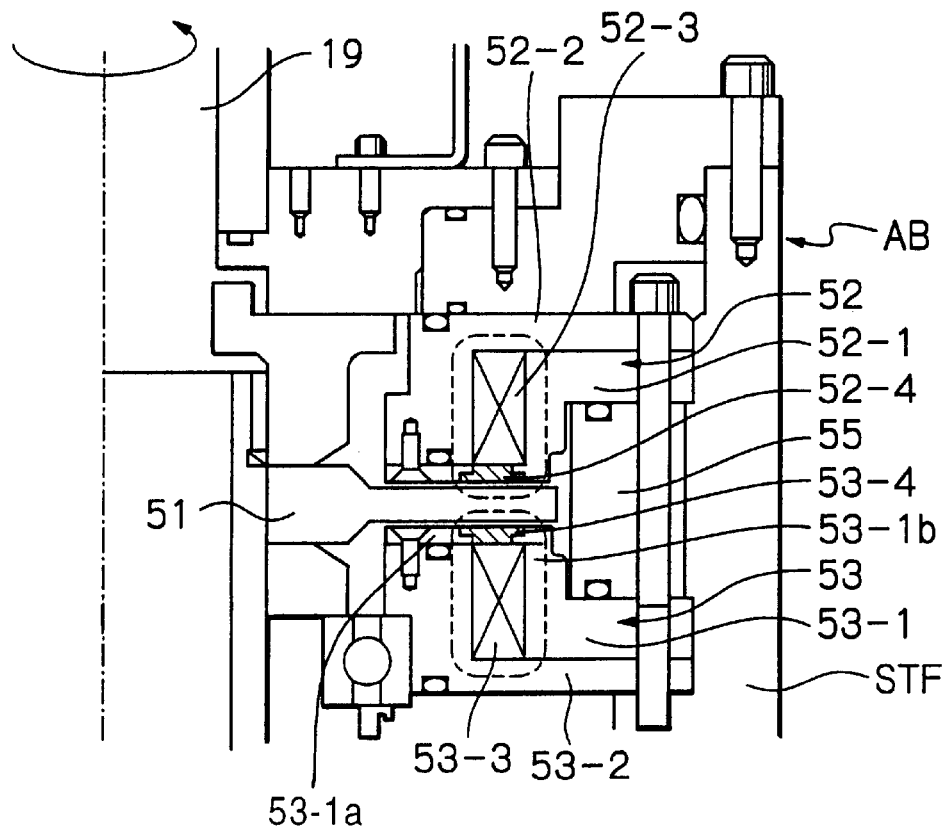
FIG. 6 is a diagram showing the arrangement of an axial magnetic bearing section of the magnetic bearing apparatus according to the present invention, in which: part (a) is a sectional side view; and part (b) is an enlarged view of a part of the axial magnetic bearing section.
Figure 6:
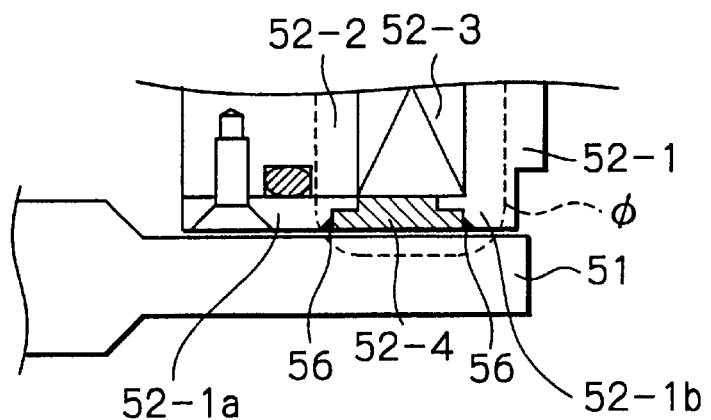

FIG. 6 shows the arrangement of an axial magnetic bearing section of the magnetic bearing apparatus according to the present invention. In FIG. 6, part (a) is a sectional side view of the axial magnetic bearing section, and part (b) is an enlarged view of a part of the axial magnetic bearing section. An axial magnetic bearing AB has a disk-shaped target 51 secured to the rotor 19. Ring-shaped electromagnets 52 and 53 are secured to the stator frame STF to face each other across the target 51 with predetermined gaps respectively provided between the electromagnets 52 and 53 and both sides of the target 51 (the upper and lower sides thereof in the figure). In this embodiment, a predetermined gap is provided between the target 51 and each of the electromagnets 52 and 53 by securing the electromagnets 52 and 53 to each other with a spacer 55 interposed therebetween.

Figure 7:
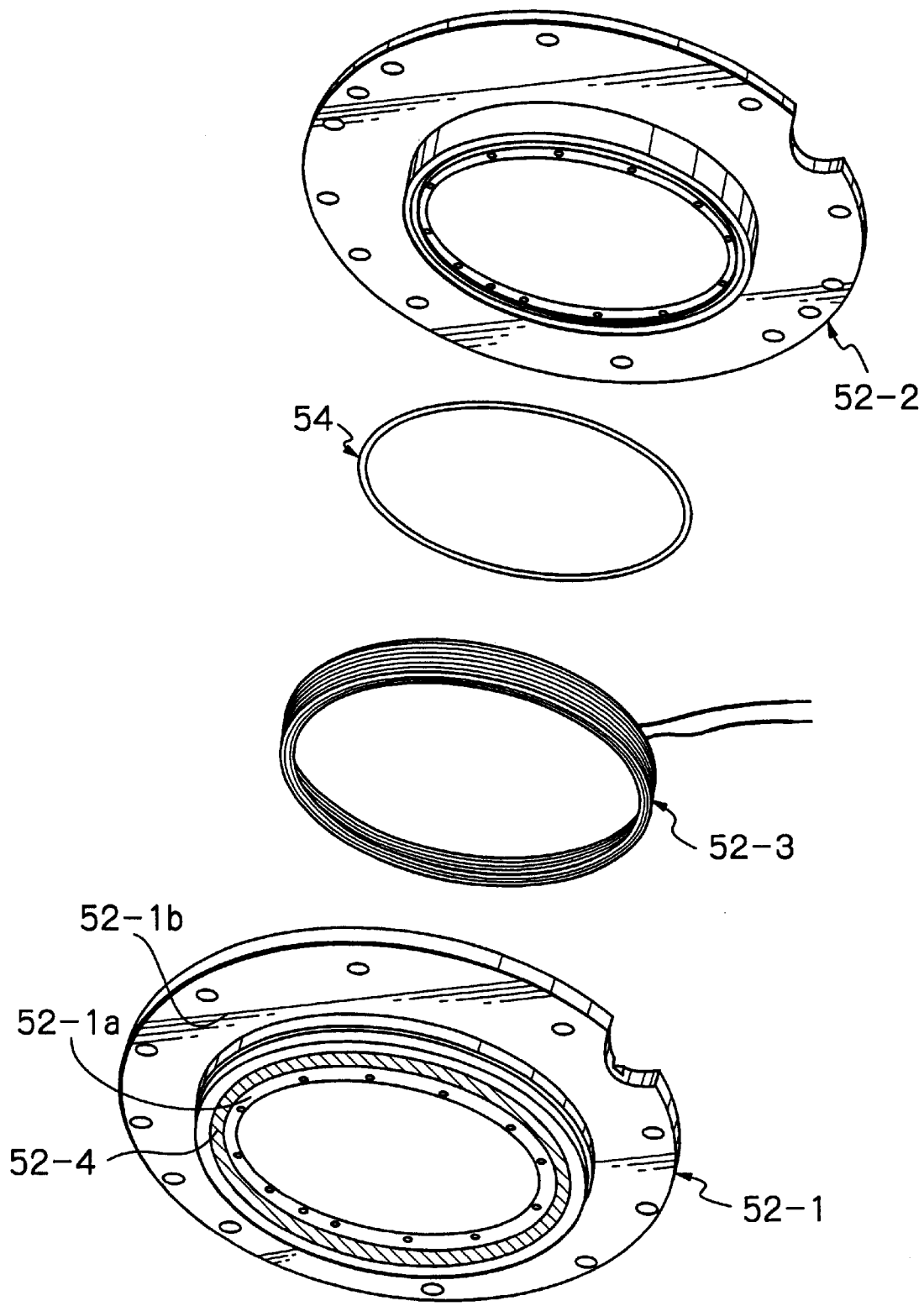
FIG. 7 is an exploded perspective view of an electromagnet in the axial magnetic bearing section of the magnetic bearing apparatus according to the present invention.

As shown in FIG. 7, the electromagnet 52 has two yoke members 52-1 and 52-2 made of a magnetic material. The yoke members 52-1 and 52-2 have a ring-shaped planar configuration and an L-shaped sectional configuration. A ring-shaped coil 52-3 is sandwiched between the yoke members 52-1 and 52-2. The yoke member 52-1 is divided into two concentric portions by a ring-shaped non-magnetic member 52-4. Although not shown, the electromagnet 53 is arranged in the same way as the electromagnet 52. That is, a ring-shaped coil 53-3 is sandwiched between two yoke members 53-1 and 53-2 having a ring-shaped planar configuration and an L-shaped sectional configuration. The yoke member 53-1 is composed of an inner peripheral portion 53-1a and an outer peripheral portion 53-1b which are concentric with respect to each other. A ring-shaped non-magnetic member (can) 53-4 is interposed between the inner peripheral portion 53-1a and the outer peripheral portion 53-1b to magnetically isolate the inner and outer peripheral portions 53-1a and 53-1b from each other.

In the axial magnetic bearing arranged as stated above, magnetic flux $\phi$ from the electromagnet 52, as shown in FIG. 6(b), passes through the magnetic path which extends from yoke member 52-1 through the target 51 and the yoke member 52-2 to the yoke member 52-1, thereby applying a control magnetic force to the target 51. The magnetic flux from the electromagnet 53 also passes through a similar magnetic path to apply a control magnetic force to the target 51. Consequently, the rotor 19, to which the target 51 is secured, is levitated to a predetermined position in the axial direction by the control magnetic force.

The above-described arrangement of the axial magnetic bearing AB, in which the coil 52-3 is sandwiched between the yoke members 52-1 and 52-2, facilitates removal of the coil 52-3 when the axial magnetic bearing AB is overhauled. During assembly, the inner and outer peripheral portions 52-1a and 52-1b of the yoke member 52-1 are screwed to the yoke member 52-2, and the ring-shaped non-magnetic member (can) 52-4 is inserted into the gap between the inner and outer peripheral portions 52-1a and 52-1b and joined thereto by forming joint sealing portions 56 by welding. Because the coil 52-3 can be put away from the yoke members 52-1 and 52-2 when welding is carried out, it is possible to prevent the coil 52-3 from being burnt.

Figure 8:
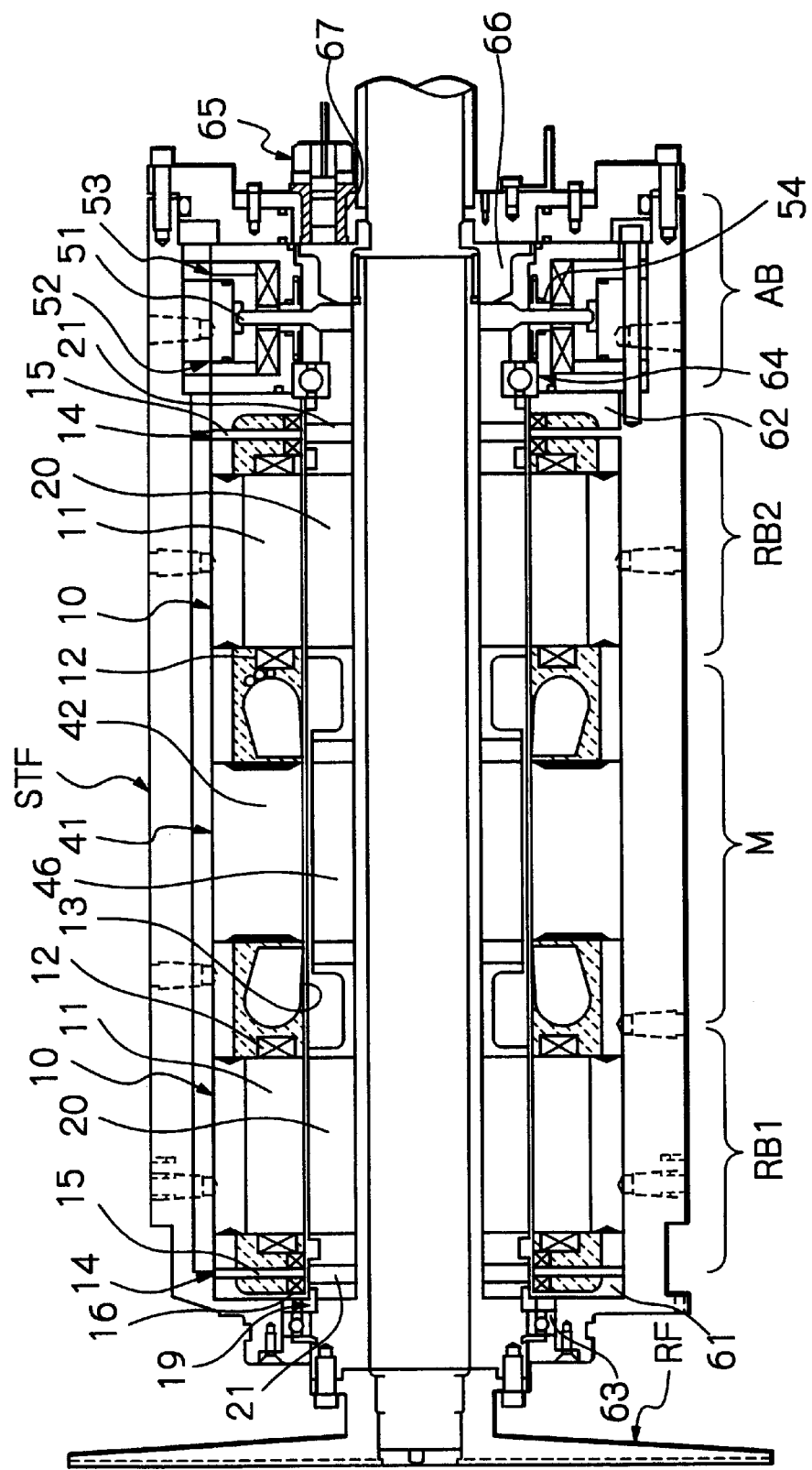
FIG. 8 is a diagram showing a structural example of a rotary machine adopting the magnetic bearing apparatus according to the present invention.

FIG. 8 shows a structural example of a rotary machine adopting the magnetic bearing apparatus according to the present invention. In FIG. 8, radial magnetic bearings RB1 and RB2, a motor M and an axial magnetic bearing AB, which are secured to a stator frame STF, are disposed around the outer periphery of a rotor 19 at predetermined axial positions of the rotor 19. Rotating blades RF are secured to an end of the rotor 19. The radial magnetic bearings RB1 and RB2 are arranged as shown in FIG. 1. That is, the radial magnetic bearings RB1 and RB2 each have an electromagnet 10 and a radial displacement sensor 14 and are secured to the stator frame STF. Electromagnet targets 20 are secured to the outer periphery of the rotor 19 at respective positions which the yokes 11 of the electromagnets 10 face. Similarly, sensor targets 21 are secured to the outer periphery of the rotor 19 at respective positions which the yokes 15 of the radial displacement sensors 14 face.

The motor M is arranged as shown in FIG. 5. That is, the motor M has a stator yoke 41 secured to the stator frame STF. A motor rotor 46 is secured to the outer periphery of the rotor 19 at a position which the magnetic poles 42 of the stator yoke 41 face.

The axial magnetic bearing AB is arranged as shown in FIG. 5. That is, the axial magnetic bearing AB has a target 51 secured to the rotor 19. Electromagnets 52 and 53 are secured to the stator frame STF in such a manner as to sandwich the target 51 therebetween.

A cylindrical can 13 is provided to cover the stator side surface of the motor M and the radial magnetic bearings RB1 and RB2, which are disposed on both sides of the motor M. Both ends of the can 13 are secured to stator side plates 61 and 62.

As shown in FIG. 1, the can 13 has magnetic members 17 and 18 buried therein at respective positions facing the yokes 11 of the electromagnets 10 and the yokes 15 of the radial displacement sensors 14 of the radial magnetic bearings RB1 and RB2. Further, as shown in FIG. 5, the can 13 has magnetic members 44 buried therein at respective positions facing the magnetic poles (yoke) 42 of the motor M. It should be noted that the rotary machine is further provided with a rotation sensor arranged as shown in FIG. 4 although illustration thereof is omitted in FIG. 8.

Reference numeral 65 in FIG. 8 denotes an axial displacement sensor for detecting an axial displacement of the rotor 19. The axial displacement sensor 65 is an eddycurrent type sensor, which is disposed to face a target 66 secured to the rotor 19. The axial displacement sensor 65 is accommodated in a casing 67 made of a non-electrical conductor (e.g. $SiO_2$). Reference numerals 63 and 64 denote touch-down bearings.

By virtue of the rotary machine structure as shown in FIG. 8, the radial magnetic bearings RB1 and RB2, the motor M and so forth can be reduced in size even when the inner surface of the stator section is covered with the can 13 to form a can structure. Therefore, the whole rotary machine can be constructed in a compact form. In addition, the radial magnetic bearings RB1 and RB2 and the motor M are superior in assembleability. The axial magnetic bearing AB is also easy to assemble and disassemble.

As has been stated above, the present invention provides the following advantageous effects:

According to the present invention, the yoke of the electromagnet is disposed to extend through the can or a magnetic member is buried in a portion of the can which the yoke of the electromagnet faces. Therefore, the magnetic gap between the yoke of the electromagnet and the rotor target for electromagnetic levitation decreases correspondingly, and hence the magnetic reluctance reduces. Accordingly, it becomes possible to reduce the size of the electromagnet.

In addition, according to the present invention, the yoke of the displacement sensor is disposed to extend through the can or a magnetic member is buried in a portion of the can which the yoke of the displacement sensor faces. Therefore, the magnetic gap between the yoke of the displacement sensor and the rotor target for detecting displacement decreases correspondingly, and hence the magnetic reluctance reduces. Accordingly, it becomes possible to reduce the size of the displacement sensor. Further, it becomes possible to improve the detection sensitivity.

In addition, according to the present invention, the yoke of the rotation sensor is disposed to extend through the can or a magnetic member is buried in a portion of the can which the yoke of the rotation sensor faces. Therefore, the magnetic gap between the yoke of the rotation sensor and the rotor target for detecting rotation decreases correspondingly, and hence the magnetic reluctance reduces. Accordingly, it becomes possible to reduce the size of the rotation sensor. Further, it becomes possible to improve the detection sensitivity.

In addition, according to the present invention, the yoke of the motor stator is disposed to extend through the can or a magnetic member is buried in a portion of the can which the yoke of the motor stator faces. Therefore, the magnetic gap between the yoke of the motor stator and the motor rotor decreases correspondingly, and hence the magnetic reluctance decreases. Accordingly, it becomes possible to reduce the size of the motor. Further, it becomes possible to improve the efficiency of the motor.

It should be noted that the present invention is not necessarily limited to the foregoing embodiments but can be modified in a variety of ways.

What is claimed is:

1. In an improved magnetic bearing apparatus of the type wherein a can made of a non-magnetic material is disposed between a rotor and a stator so as to cover the surface of the stator, and said rotor is supported in a levitational manner by a magnetic force of an electromagnet provided on a stator-side member, the improvement comprising:

a yoke of said electromagnet disposed to extend through said can which the yoke of said electromagnet faces, so that said yoke faces a target for magnetic levitation on said rotor directly or through a magnetic member in a non-contact manner, wherein said magnetic bearing apparatus is used in a gas processing system and said can covers the surface of said stator so as to protect components provided on the stator-side member from a processing gas.

2. In an improved magnetic bearing apparatus of the type wherein a can made of a non-magnetic material is disposed between a rotor and a stator so as to cover the surface of the stator, and said rotor is supported in a levitational manner by a magnetic force of an electromagnet provided on a stator-side member, and further a displacement of said rotor is detected with a displacement sensor provided on the stator-side member, the improvement comprising:

at least a yoke of said displacement sensor disposed to extend through said can, or a magnetic member buried in a portion of said can which the yoke of said displacement sensor faces, so that said yoke faces a target for detecting displacement on said rotor directly or through said magnetic member in a non-contact manner, wherein said magnetic bearing apparatus is used in a gas processing system and said can covers the surface of said stator so as to protect components provided on the stator-side member from a processing gas.

3. In an improved magnetic bearing apparatus of the type wherein a can made of a non-magnetic material is disposed between a rotor and a stator so as to cover the surface of the stator, and said rotor is supported in a levitational manner by a magnetic force of an electromagnet provided on a stator-side member, and further rotation of said rotor is detected with a rotation sensor provided on the stator-side member, the improvement comprising:

at least a yoke of said rotation sensor disposed to extend through said can, or a magnetic member buried in a portion of said can which the yoke of said rotation sensor faces, so that said yoke faces a target for detecting rotation on said rotor directly or through said magnetic member in a non-contact manner, wherein said magnetic bearing apparatus is used in a gas processing system and said can covers the surface of said stator so as to protect components provided on the stator-side member from a processing gas.

4. In an improved magnetic bearing apparatus of the type wherein a can made of a non-magnetic material is disposed between a rotor and a stator so as to cover the surface of the stator, and said rotor is supported in a levitational manner by a magnetic force of an electromagnet provided on a stator-side member, and further said rotor is rotated by a magnetic force from a motor stator provided on the stator-side member, the improvement comprising:

at least a yoke of said motor stator disposed to extend through said can, or a magnetic member buried in a portion of said can which the yoke of said motor stator faces, so that said yoke faces said rotor directly or through said magnetic member in a non-contact manner, wherein said magnetic bearing apparatus is used in a gas processing system and said can covers the surface of said stator so as to protect components provided on the stator-side member from a processing gas.

5. In an improved magnetic bearing apparatus of the type wherein a disk shaped target is secured to a rotor, ring-shaped electromagnets are secured to a stator to face each other across said target with predetermined gaps respectively provided between said electromagnets and both sides of said target, and said rotor is supported in a levitational manner by a magnetic force from said electromagnets, the improvement comprising:

each of said electromagnets having two yoke members made of a magnetic material, one facing said target and the other being away from said target, a ring-shaped coil sandwiched between said two yoke members, and said yoke member facing said target is divided into two concentric portions by a ring-shaped non-magnetic member.

* * * * *